(12) United States Patent
Li

(10) Patent No.: US 11,175,547 B2
(45) Date of Patent: Nov. 16, 2021

(54) ARRAY SUBSTRATE AND DISPLAY PANEL

(71) Applicants: HKC Corporation Limited, Guangdong (CN); Chongqing HKC Optoelectronics Technology Co., Ltd., Chongqing (CN)

(72) Inventor: Zeyao Li, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 1 day.

(21) Appl. No.: 16/982,588

(22) PCT Filed: Nov. 22, 2018

(86) PCT No.: PCT/CN2018/116880
§ 371 (c)(1),
(2) Date: Sep. 21, 2020

(87) PCT Pub. No.: WO2020/062513
PCT Pub. Date: Apr. 2, 2020

(65) Prior Publication Data
US 2021/0018804 A1 Jan. 21, 2021

(30) Foreign Application Priority Data
Sep. 30, 2018 (CN) .......................... 201811157046.9

(51) Int. Cl.
G02F 1/1362 (2006.01)

(52) U.S. Cl.
CPC .. G02F 1/136259 (2013.01); G02F 1/136254 (2021.01); G02F 1/136263 (2021.01)

(58) Field of Classification Search
None
See application file for complete search history.

(56) References Cited

U.S. PATENT DOCUMENTS

| 2010/0014030 A1 | 1/2010 | Lin |
| 2010/0163284 A1 | 7/2010 | Tanahara |
| 2010/0302750 A1* | 12/2010 | Chen .................. H01L 27/1259 361/792 |

FOREIGN PATENT DOCUMENTS

| CN | 1542507 A | 11/2004 |
| CN | 101308267 A | 11/2008 |
| CN | 101592804 A | 12/2009 |

(Continued)

OTHER PUBLICATIONS

1st Office Action of counterpart Chinese Patent Application No. 201811157046.9 dated Mar. 3, 2020.

(Continued)

*Primary Examiner* — James A Dudek

(57) ABSTRACT

Disclosed are an array substrate and a display panel formed by cutting the array substrate, the array substrate includes a substrate body, a first test line, a second test line, and a cutting line; the substrate body includes a plurality of display units and a cutting area located between the plurality of display units; the first test line and the second test line are disposed in the cutting area; the first test line is disposed across the second test line and insulated from each other; the first test line and/or the second test line includes a bending segment disposed across the cutting line.

14 Claims, 4 Drawing Sheets

(56) References Cited

FOREIGN PATENT DOCUMENTS

| | | | |
|---|---|---|---|
| CN | 101615368 | A | 12/2009 |
| CN | 107463038 | A | 12/2017 |
| JP | H01304744 | A | 12/1989 |
| JP | 3639649 | B2 | 4/2005 |
| TW | 201042339 | A | 12/2010 |

OTHER PUBLICATIONS

1st Office Action of counterpart Chinese Patent Application No. 201811165415.9 dated Apr. 1, 2020.
International Search Report of PCT Patent Application No. PCT/CN2018/116880 dated Jul. 1, 2019.
2nd Office Action of counterpart Chinese Patent Application No. 201811157046.9 dated Aug. 6, 2020.

\* cited by examiner

US 11,175,547 B2

ARRAY SUBSTRATE AND DISPLAY PANEL

CROSS-REFERENCE TO RELATED APPLICATION

The present disclosure claims priority to Chinese Patent Application with No. 201811157046.9, entitled "ARRAY SUBSTRATE AND DISPLAY PANEL" filed on Sep. 30, 2018, the disclosure of which is incorporated herein by reference in its entirety.

FIELD OF THE DISCLOSURE

The present disclosure relates to the technical field of display, and in particular, to an array substrate and a display panel.

BACKGROUND OF THE DISCLOSURE

The statements herein merely provide background information related to the present disclosure and do not necessarily constitute prior art. The liquid crystal display technology is widely used in the display of televisions, mobile phones and public information. Liquid crystal displays are flat and ultra-thin display devices, and the demand for the whole society is very large. In order to improve capacity and production efficiency, a plurality of display panels are generally produced on a large glass substrate, and the large glass substrate is divided into a plurality of individual display panels along a specific cutting line by a cutter wheel. Before cutting, it is necessary to do some testing or detection on the large glass substrate, so it is required to set up some test lines (conductive thin film circuits) on the large glass substrate to transmit electrical signals when testing or detecting the large glass substrate.

In an exemplary embodiment, these test lines are typically designed in a gap (cutting area) between a plurality of display panels, where there is inevitably a overline structure (ie, test circuit crossings that transmit different signals). In order to prevent mutual interference between different electrical signals, different test circuits are insulated from each other by an insulating layer. However, when the cutter wheel performs cutting, since the cutter wheel will cut through the overline structure, it is easy to cause a short circuit between the two test circuits transmitting different electrical signals, thereby causing mutual interference between different signals.

SUMMARY OF THE DISCLOSURE

The main objective of the present disclosure is to propose an array substrate designed to avoid short circuits between two test circuits on the array substrate that transmit different electrical signals.

To achieve the above objective, the array substrate provided by the present disclosure includes:

a substrate body including a plurality of display units and a cutting area located among the plurality of display units;

a first test line disposed in the cutting area;

a second test line disposed in the cutting area, the second test line is disposed across the first test line and the second test line and the first test line are insulated from each other; and a cutting line disposed in the cutting area, and the first test line and/or the second test line includes a bending segment disposed across the cutting line.

Optionally, the array substrate further includes a first overline portion located at an intersection of the first test line and the second test line, and the first overline portion is located on the cutting line.

Optionally, the first test line includes a body segment, a connecting segment and a bending segment, and the connecting segment connects with the bending segment and the body segment disposed across the second test line.

Optionally, the bending segment is located on one side of the first overline portion.

Optionally, the first test line includes a bending segment and the bending portion includes a first bending segment and a second bending segment located on opposite sides of the first overline portion respectively, and the first bending segment and the second bending segment are disposed across the cutting line respectively.

Optionally, the array substrate includes a third test line disposed in the cutting area and disposed across the first test line. The third test line and the first test line are insulated from each other.

Optionally, the array substrate further includes a second overline portion located at an intersection of the first test line and the third test line. The second overline portion is located on the cutting line.

Optionally, the bending segment includes a third bending segment located on a side of the third test line away from the second test line. The third bending segment is disposed across the cutting line.

Optionally, an included angle between the bending segment and the cutting line is greater than 0 degree and less than or equal to 90 degrees.

The present disclosure further proposes an array substrate, including:

a substrate body including a plurality of display units and a cutting area. A plurality of the display units are arranged in an array, and a gap between the plurality of display units forms the cutting area;

a first test line disposed in the cutting area;

a second test line disposed in the cutting area. The second test line is disposed across the first test line and the second test line and the first test line are insulated from each other; and a cutting line disposed in the cutting area, and the first test line and/or the second test line includes a bending segment disposed across the cutting line.

The present disclosure further proposes a display panel. The display panel is formed by cutting an array substrate, including:

a substrate body including a plurality of display units and a cutting area located between the plurality of display units;

a first test line disposed in the cutting area;

a second test line disposed in the cutting area, the second test line is disposed across the first test line and the second test line and the first test line are insulated from each other; and a cutting line disposed in the cutting area, and the first test line and/or the second test line includes a bending segment disposed across the cutting line.

Optionally, the array substrate further includes a first overline portion located at an intersection of the first test line and the second test line, and the first overline portion is located on the cutting line.

Optionally, the first test line includes a body segment, a connecting segment and a bending segment, and the connecting segment connects with the bending segment and the body segment disposed across the second test line.

Optionally, the bending segment is located on one side of the first overline portion.

Optionally, the bending portion includes a first bending segment and a second connecting segment located on opposite sides of the first overline portion respectively, and the first bending segment and the second bending segment are disposed across the cutting line respectively.

Optionally, the array substrate includes a third test line disposed in the cutting area and disposed across the first test line. The third test line and the first test line are insulated from each other.

Optionally, the array substrate further includes a second overline portion located at an intersection of the first test line and the third test line. The second overline portion is located on the cutting line.

Optionally, the bending segment includes a third bending segment located on a side of the third test line away from the second test line. The third bending segment is disposed across the cutting line.

Optionally, an included angle between the bending segment and the cutting line is greater than 0 degree and less than or equal to 90 degrees.

Optionally, a plurality of the display units are arranged in an array, and a gap between the plurality of display units forms the cutting area.

The technical schemes of the present disclosure provides a plurality of display units and a cutting area between the plurality of display units on the substrate body, and provides a first test line and a second test line in the cutting area. The first test line is disposed across the second test line and the first test line and the second test line are insulated from each other so that the first test line and the second test line independently transmit electrical signals; the cutting area is further provided with a cutting line, and the first test line and/or the second test line includes a bending segment, and the bending segment is disposed across the cutting line, so that the short circuit between the first test line and the second test line due to the cutter wheel cutting can be effectively avoided, so that the display panel formed by cutting the array substrate does not cause an abnormality in subsequent applications.

BRIEF DESCRIPTION OF THE DRAWINGS

In order to illustrate the technical schemes in the embodiments of the present disclosure or in the exemplary art more clearly, the drawings which are required to be used in the description of the embodiments or the exemplary art are briefly described below. It is obvious that the drawings described below are only some embodiments of the present disclosure. It is apparent to those of ordinary skill in the art that other drawings may be obtained based on the structures shown in accompanying drawings without inventive effort.

LABELS ILLUSTRATION FOR DRAWINGS

Figure 1:
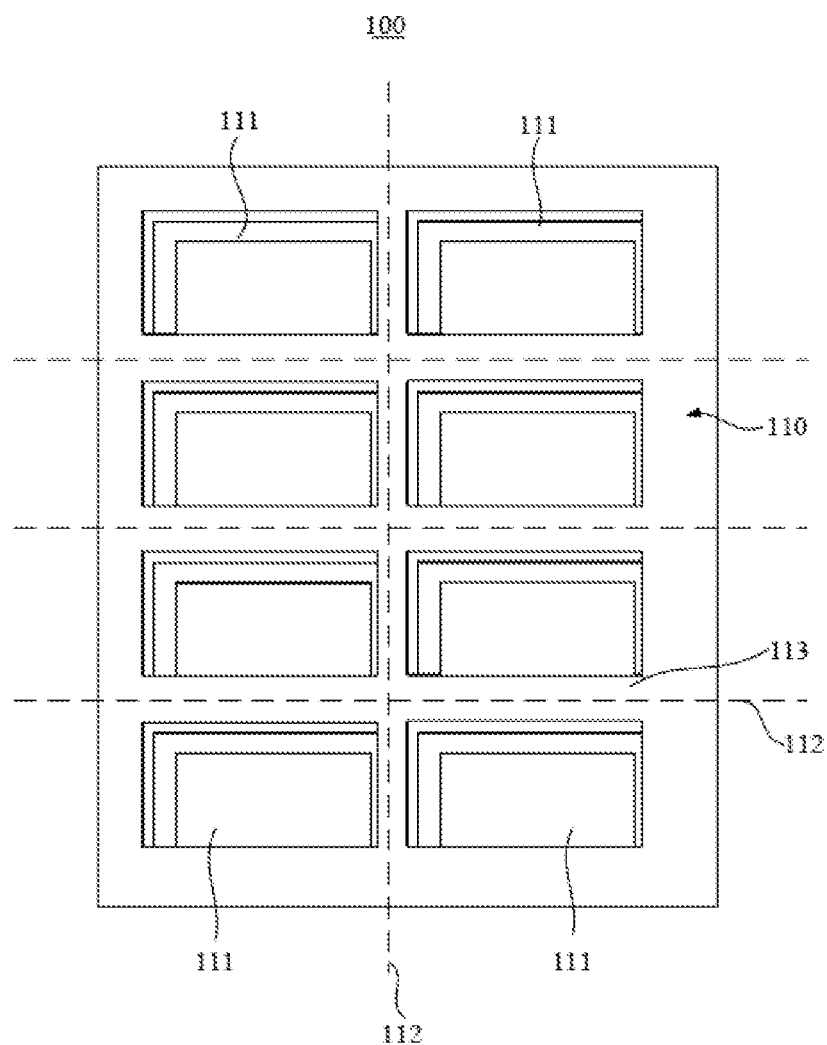
FIG. 1 is a structural schematic view of an array substrate of the present disclosure.

| Label | Name |
|-------|------|
| 100 | array substrate |
| 110 | substrate body |
| 111 | display unit |
| 112 | cutting line |
| 113 | cutting area |
| 120 | first test line |
| 121 | bending segment |
| 121a | first bending segment |
| 121b | second bending segment |
| 121c | third bending segment |
| 122 | body segment |
| 123 | connecting segment |
| 130 | second test line |
| 140 | third test line |
| 150 | first overline portion |
| 160 | second overline portion |
| 170 | insulating functional layer |

The object realization, function characteristics and advantages of this application will be further described in reference to embodiments and accompanying drawings.

DETAILED DESCRIPTION OF THE EMBODIMENTS

The technical schemes of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure. All other embodiments obtained by persons of ordinary skill in the art based on the embodiments of the present disclosure without creative efforts shall fall within the scope of protection of the present disclosure.

It should be noted that, if there is a directional indication (such as up, down, left, right, front, back, . . . ) in the embodiments of the present disclosure, the directional indication is only used to explain the relative positional relationship, the motion situation, etc. between the components in a certain posture (as shown in the drawings), and if the certain posture changes, the directional indication also changes accordingly.

In addition, if there is a description related to "first", "second", etc. in the embodiments of the present disclosure, the description of the "first", "second", etc. is used for the purpose of description only, and is not to be construed as indicating or implying its relative importance or implicitly indicating the number of technical features indicated. Thus, features defined by "first" or "second" may include at least one of the features, either explicitly or implicitly. In addition, the meaning of "and/or" appearing throughout the text includes three parallel schemes, taking "A and/or B" as an example, including the A scheme, or the B scheme, or the scheme in which both A and B are simultaneously satisfied.

In addition, the technical schemes between the various embodiments may be combined with each other, provided that those skilled in the art can implement it, and when the combination of the technical schemes is contradictory or impossible to implement, it should be considered that the combination of these technical schemes does not exist, nor is it within the scope of protection required by this application.

The liquid display panel includes an array substrate, a color film substrate facing the array substrate, and a liquid crystal layer disposed between the array substrate and the color film substrate. When preparing a liquid crystal display panel, in order to increase capacity, a plurality of liquid crystal display panels are collectively fabricated on a large array substrate (large glass substrate), and then cut by a cutter wheel along a cutting line of the cutting area, and finally a separate liquid crystal display panel is obtained.

The present disclosure proposes an array substrate. In general, the array substrate is fabricated by a multi-pass photolithography process, in which a multilayer functional film (such as an insulating functional film) and a conductive thin film are integrated. The conductive thin film exists in different shapes of circuits, and plays a role in transmitting electrical signals during the manufacture and use of the liquid crystal display panel. Among which, the conductive thin film circuit includes a first type of conductive thin film circuit and a second type of conductive thin film circuit. The first type of conductive thin film circuit is designed in each single-chip liquid crystal display panel for transmitting electrical signals for normal use of the liquid crystal display panel; the second type of conductive thin film circuit is designed in the gap between the plurality of liquid crystal display panels for transmitting electrical signals before the array substrate is cut to test or detect the array substrate.

Figure 2:
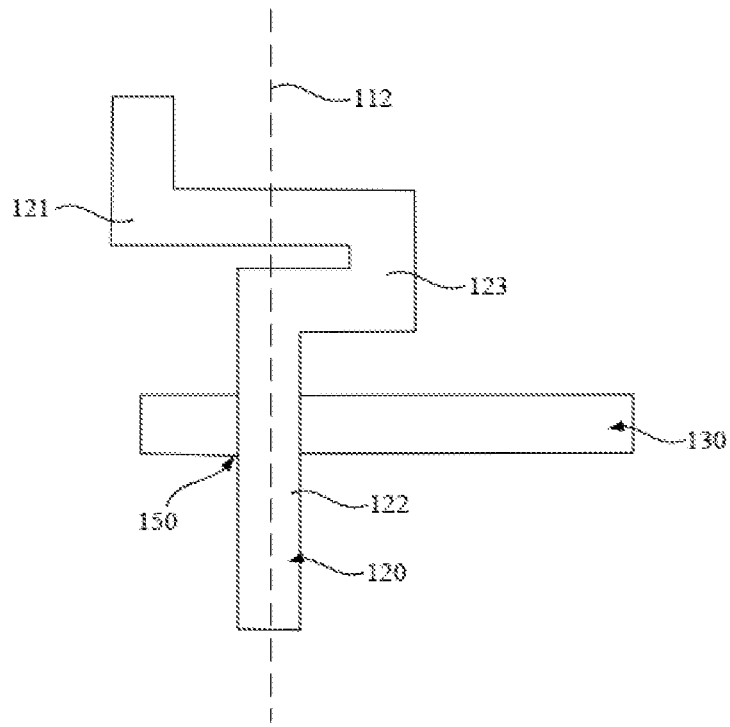
FIG. 2 is a schematic view showing a test circuit distribution of an embodiment of the array substrate of FIG. 1.
Figure 3:
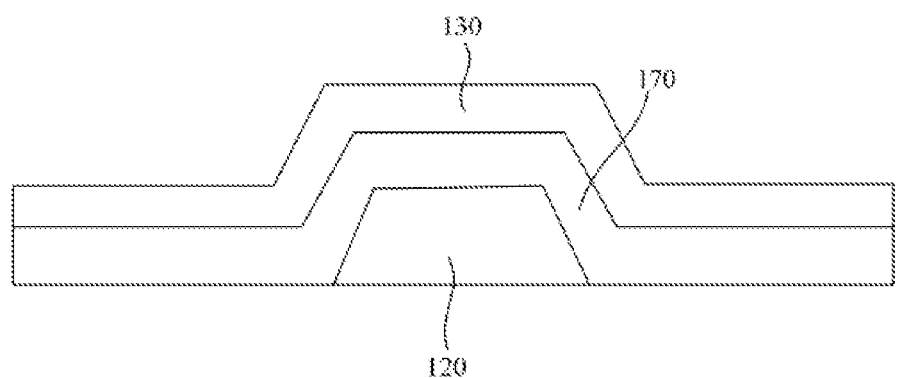
FIG. 3 is a cross-sectional view of the first overline portion of the array substrate of FIG. 1.

Referring to FIGS. 1 to 3, an array substrate 100 proposed by the present disclosure includes a substrate body 110, a first test line 120, a second test line 130, and a cutting line 112. The substrate body 110 includes a plurality of display units 111 and a cutting area 113 located between the plurality of display units 111. The first test line 120 is disposed in the cutting area 113; the second test line 130 is disposed in the cutting area 113. The second test line 130 is disposed across the first test line 120 and the second test line 130 and the first test line 120 are insulated from each other. The cutting line 112 is disposed in the cutting area 113. The first test line 120 and/or the second test line 130 is disposed in the bending segment 121, and the bending segment 121 is disposed across the cutting line 112.

Specifically, a plurality of display units 111 on the substrate body 110 are arranged in an array, and a gap between a plurality of display units 111 forms a cutting area 113. A first test line 120 and a second test line 130 are disposed in the cutting area 113. The first test line 120 and the second test line 130 are conductive thin film circuits integrated on the array substrate 100. The first test line 120 and the second test line 130 are located on layers of different heights of the substrate body 110 respectively, and are insulated from each other by an insulating functional layer 170 (as shown in FIG. 3). The array substrate further includes a first overline portion 150 located at an intersection of the first test line 120 and the second test line 130. Herein, it should be noted that the intersection of the first test line 120 and the second bending portion 130 means that the first test line 120 is intersected with the projection of the second test line 130 in the plane of the substrate body 110, that is, an overline portion is formed between the first test line 120 and the second test line 130. For convenience of description, the overline portion formed between the first test line 120 and the second test line 130 is defined as the first overline portion 150.

The first test line 120 may extend in the lateral direction or in the longitudinal direction. Similarly, the second test line 130 may extend in the lateral direction or in the longitudinal direction, which is not specifically limited herein. In the embodiment of the present disclosure, if the first test line 120 extends in the lateral direction, the second test line 130 extends in the longitudinal direction; if the first test line 120 extends in the longitudinal direction, the second test line 130 extends in the lateral direction; the overline portion is formed between the first test line 120 and the second test line 130 in this way. For convenience of description, the first test line 120 extending in the longitudinal direction, and the second test line 130 extending in the lateral direction will be taken as an example.

The cutting line 112 in the cutting area 113 is configured for defining a cutting trajectory of the cutter wheel. Among which, the cutting line 112 may extend in the lateral direction. Without doubt, the cutting line 112 may also extend in longitudinal direction, which is not specifically limited herein. It should be noted that if the cutting line 112 extends in the longitudinal direction, the first test line 120 includes a bending segment 121, and the cutting line 112 is disposed across the bending segment 121 of the first test line 120, so that when the cutter wheel cuts along the cutting edge 112, the first test line 120 can be cut into at least two parts, thereby disconnecting the first test line 120, and a short circuit between the first test line 120 and the second test line 130 is avoided. If the cutting line 112 extends in the lateral direction, the second test line 130 includes a bending segment 121, and the cutting line 112 is disposed across the bending segment 121 of the second test line 130, so that when the cutter wheel cuts along the cutting edge 112, the second test line 130 can be cut into at least two segments, thereby disconnecting the second test line 130, and avoiding a short circuit between the first test line 120 and the second test line 130. The cutting line 112 extends in the longitudinal direction and the first test line 120 includes a bending segment 121, and the cutting line 112 is disposed across the bending segment 121 of the first test line 120, which is taken as an example for detailed description.

Figure 4:
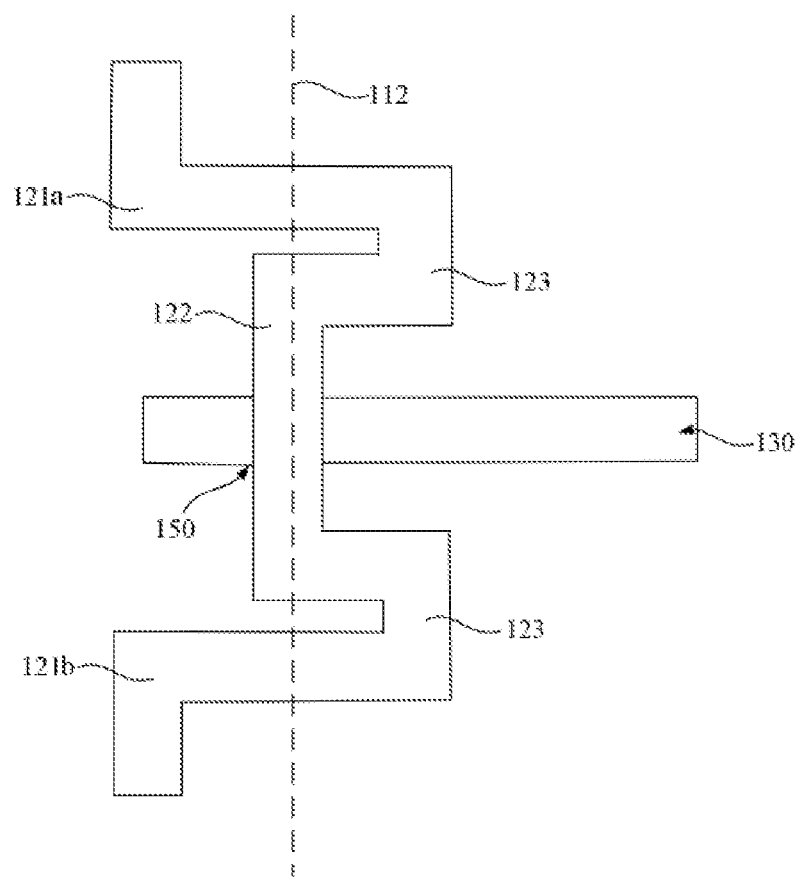
FIG. 4 is a schematic view showing a test circuit distribution of another embodiment of the array substrate of FIG. 1.
Figure 5:
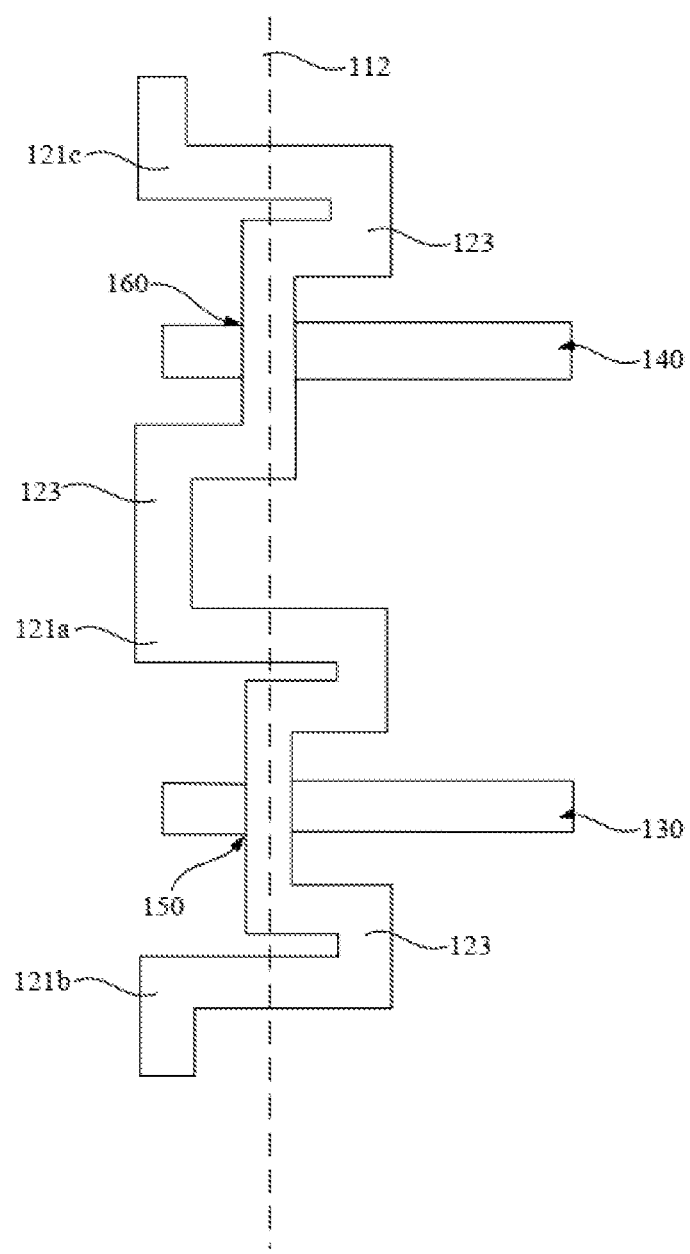
FIG. 5 is a schematic view showing a test circuit distribution of a further embodiment of the array substrate of FIG. 1.

In the embodiment of the present disclosure, referring to FIGS. 2, 4 and 5, the first test line 120 includes a body segment 122, a connecting segment 123 and a bending segment 121, and the connecting segment 123 connects with the bending segment 121 and the body segment 122, and the body segment 122 is disposed across the second test line 130. The first overline portion 150 is located at an intersection of the body segment 122 and the second test line 130. Specifically, the bending segment 121 is disposed in a straight line shape. Without doubt, the bending segment 121 may also be disposed in a fold line shape. The quantity of the bending segments 121 will not be specifically limited. For example, the quantity of the bending segments 121 may be one, two or more, and the like. For example, if the quantity of the bending segments 121 of the first test line 120 is one, the bending segment 121 is located at one side (upper or lower side) of the first overline portion 150; for another example, if the quantity of the bending segments 121 of the first test line 120 is two, the two bending segments 121 are respectively located on opposite sides (upper side and lower side) of the first overline portion 150. It will be described in detail below. In addition, the shapes of the connecting segment 123 may be various. For example, the connecting segment 123 may be a straight line type, an L shape, or other irregular shapes, which will not be specifically limited herein. In the embodiment of the present disclosure, the connecting segment 123 is L-shaped.

Referring to FIGS. 2 and 4, in the embodiment of the present disclosure, the first overline portion 150 is located on the cutting line 112, that is, when the cutter wheel performs cutting, the first overline portion 150 is cut. Herein, a short circuit occurs due to the lap joint between the conductive thin film of the first test line 120 and that of the second test line 130 due to the ductility of the conductive thin film. Therefore, the cutting line 112 can be disposed across the bending segment 121 of the first test line 120, so that when the cutter wheel cuts along the cutting edge 112, the first test line 120 can be cut into at least two segments by cutting the bending segment 121 of the first test line 120, thereby disconnecting the first test line 120, and avoiding a short circuit between the first test line 120 and the second test line 130.

Without doubt, it can be understood that, in other embodiments, the first overline portion 150 may also be located on one side of the cutting line 112, that is, when the cutter wheel performs cutting, the first overline portion 150 won't be cut, thereby effectively avoiding the potential occurrence of a short circuit between the first test line 120 and the second test line 130.

The technical solutions of the present disclosure provides a plurality of display units 111 and a cutting area 113 between the plurality of display units 111 on the substrate body 110, and provides a first test line 120 and a second test line 130 in the cutting area 113. The first test line 120 is disposed across the second test line 130 and the first test line 120 and the second test line 130 are insulated from each other so that the first test line 120 and the second test line 130 independently transmit electrical signals; the cutting area 113 is further provided with a cutting line 112, and the first test line 120 and/or the second test line 130 includes a bending segment 121, and the bending segment 121 is disposed across the cutting line 112, so that the short circuit between the first test line 120 and the second test line 130 due to the cutter wheel cutting can be effectively avoided, so that the display panel formed by cutting the array substrate 100 does not cause an abnormality in subsequent applications.

The positional distribution of the bending segment 121 of the first test line 120 can be various, as will be described in detail below.

Referring to FIG. 2, in an embodiment, the bending segment 121 of the first test line 120 is located on the upper side of the first overline portion 150, and the bending segment 121 is disposed across the cutting line 112. When the cutter wheel cuts along the cutting edge 112, the first test line 120 can be cut into two segments, thereby disconnecting the first test line 120, and avoiding a short circuit between the first test line 120 and the second test line 130.

In another embodiment, the bending segment 121 of the first test line 120 is located on the lower side of the first overline portion 150, and the bending segment 121 is disposed across the cutting line 112. Similarly, when the cutter wheel cuts along the cutting edge 112, the first test line 120 can be cut into two segments, thereby disconnecting the first test line 120, and avoiding a short circuit between the first test line 120 and the second test line 130.

Referring to FIG. 4, in another embodiment, the bending segment 121 of the first test line 120 includes a first bending segment 121a and a second bending segment 121b. The first bending segment 121a and the second bending segment 121b are located on opposite sides of the first overline portion 150 respectively, and the first bending segment 121a and the second bending segment 121b are disposed across the cutting line 112 respectively. When the cutter wheel cuts along the cutting line 112, the first overline portion 150 can be isolated, so that a short circuit between the first test line 120 and the second test line 130 can be effectively avoided.

Referring to FIG. 5, on the basis of the above embodiments, the array substrate 100 further includes a third test line 140 disposed in the cutting area 113 and disposed across the first test line 120. The third test line 140 and the first test line 120 are insulated from each other.

Specifically, the third test line 140 extends in the lateral direction. The third test line 140 and the first test line 120 are located on layers of different heights of the array substrate 100, and are insulated from each other by an insulating functional layer 170. The array substrate further includes a second overline portion 160 located at an intersection of the first test line 120 and the third test line 130. Herein, it should be noted that the intersection of the first test line 120 and the third test line 140 means that the first test line 120 is intersected with the projection of the third test line 140 in the plane of the substrate body 110, that is, an overline portion is formed between the first test line 120 and the third test line 140. For convenience of description, the overline portion formed between the first test line 120 and the third test line 140 is defined as the second overline portion 160. Among which, the second overline portion 160 is located on the cutting line 112.

In the present embodiment, the bending segment 121 of the first test line 120 includes a third bending segment 121c located on a side of the third test line 140 away from the second test line 130. The third bending segment 121c is disposed across the cutting line 112. In this way, when the cutter wheel cuts along the cutting line 112, the first overline portion 150 and the second overline portion 160 can be isolated, so that a short circuit between the first test line 130 and the third test line 140 can be effectively avoided.

On the basis of the above embodiments, an included angle between the bending segment 121 and the cutting line 112 is greater than 0 degree and less than or equal to 90 degrees. Optionally, the included angle between the bending segment 121 and the cutting line 112 is 30, 60, 70, 90 degrees, etc. Herein, the bending segment 121 includes a first bending segment 121a, a second bending segment 121b, and a third bending segment 121c.

The present disclosure also proposes a display panel, which is formed by cutting an array substrate 100. The specific structure of the array substrate 100 can be understood with reference to the foregoing embodiments. Since the array substrate 100 adopts all the technical schemes of all the above embodiments, it has at least all the beneficial effects brought about by the technical schemes of the above embodiments, and details are not described herein again The embodiments above are merely optional embodiments of the present disclosure but are not to be construed as limiting the scope of the present disclosure, and any equivalent structural conversion devised based on the inventive concept of the present disclosure or using the drawing of the present disclosure, or a direct or indirect application of the present disclosure to another related technical field shall fall into the scope of protection of the present disclosure.

What is claimed is:
1. An array substrate, wherein, the array substrate comprises:
    a substrate body comprising a plurality of display units and a cutting area located between the plurality of display units;
    a first test line disposed in the cutting area;

a second test line disposed in the cutting area, the second test line is disposed across the first test line, and the second test line and the first test line are insulated from each other; and a cutting line disposed in the cutting area, and the first test line and/or the second test line comprises a bending segment disposed across the cutting line;

wherein the array substrate comprises a third test line disposed in the cutting area and disposed across the first test line, and the third test line and the first test line are insulated from each other;

the array substrate further comprises a second overline portion located at an intersection of the first test line and the third test line, and the second overline portion is located on the cutting line; and the bending segment further comprises a third bending segment located on a side of the third test line away from the second test line, and the third bending segment is disposed across the cutting line.

2. The array substrate according to claim 1, wherein the array substrate further comprises a first overline portion located at an intersection of the first test line and the second test line, and the first overline portion is located on the cutting line.

3. The array substrate according to claim 2, wherein the first test line comprises a body segment, a connecting segment, and the bending segment, and the connecting segment connects with the bending segment and the body segment, and the body segment is disposed across the second test line.

4. The array substrate according to claim 3, wherein the bending segment is located on one side of the first overline portion.

5. The array substrate according to claim 3, wherein the bending portion comprises a first bending segment and a second bending segment located on opposite sides of the first overline portion respectively, and the first bending segment and the second bending segment are disposed across the cutting line respectively.

6. The array substrate according to claim 1, wherein an included angle between the bending segment and the cutting line is greater than 0 degree and less than or equal to 90 degrees.

7. An array substrate, wherein, the array substrate comprises:

a substrate body comprising a plurality of display units and a cutting area, and the plurality of the display units are arranged in an array, and a gap between the plurality of display units forms the cutting area;

a first test line disposed in the cutting area;

a second test line disposed in the cutting area and the second test line is disposed across the first test line, and the second test line and the first test line are insulated from each other; and a cutting line disposed in the cutting area, and the first test line and/or the second test line includes a bending segment disposed across the cutting line;

wherein the array substrate comprises a third test line disposed in the cutting area and disposed across the first test line, and the third test line and the first test line are insulated from each other;

the array substrate further comprises a second overline portion located at an intersection of the first test line and the third test line, and the second overline portion is located on the cutting line; and the bending segment further comprises a third bending segment located on a side of the third test line away from the second test line, and the third bending segment is disposed across the cutting line.

8. A display panel, wherein the display panel is formed by cutting an array substrate, the array substrate comprises:

a substrate body comprising a plurality of display units and a cutting area located between the plurality of display units;

a first test line disposed in the cutting area;

a second test line disposed in the cutting area, the second test line is disposed across the first test line, and the second test line and the first test line are insulated from each other; and a cutting line disposed in the cutting area, and the first test line and/or the second test line comprises a bending segment disposed across the cutting line;

the array substrate comprises a third test line disposed in the cutting area and disposed across the first test line, and the third test line and the first test line are insulated from each other;

the array substrate further comprises a second overline portion located at an intersection of the first test line and the third test line, and the second overline portion is located on the cutting line; and the bending segment comprises a third bending segment located on a side of the third test line away from the second test line, and the third bending segment is disposed across the cutting line.

9. The display panel according to claim 8, wherein the array substrate further comprises a first overline portion located at an intersection of the first test line and the second test line, and the first overline portion is located on the cutting line.

10. The display panel according to claim 9, wherein the first test line comprises a body segment, a connecting segment, and the bending segment, and the connecting segment connects with the bending segment and the body segment, and the body segment is disposed across the second test line.

11. The display panel according to claim 10, wherein the bending segment is located on one side of the first overline portion.

12. The display panel according to claim 10, wherein the bending portion comprises a first bending segment and a second bending segment located on opposite sides of the first overline portion respectively, and the first bending segment and the second bending segment are disposed across the cutting line respectively.

13. The display panel according to claim 8, wherein an included angle between the bending segment and the cutting line is greater than 0 degree and less than or equal to 90 degrees.

14. The display panel according to claim 8, wherein a plurality of the display units are arranged in an array, and a gap between the plurality of display units forms the cutting area.

* * * * *